United States Patent
Kanehara et al.

(10) Patent No.: US 7,354,365 B2
(45) Date of Patent: Apr. 8, 2008

(54) METAL BELT

(75) Inventors: Shigeru Kanehara, Saitama (JP); Hideaki Aoyama, Saitama (JP); Toru Yagasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 102 days.

(21) Appl. No.: 11/336,972

(22) Filed: Jan. 23, 2006

(65) Prior Publication Data

US 2006/0183587 A1 Aug. 17, 2006

(30) Foreign Application Priority Data

Feb. 14, 2005 (JP) .............................. 2005-036366

(51) Int. Cl.
*F16G 1/22* (2006.01)

(52) U.S. Cl. .................................... 474/242

(58) Field of Classification Search ................ 474/201, 474/238, 240, 242, 244, 245, 246, 265
See application file for complete search history.

(56) References Cited

U.S. PATENT DOCUMENTS

| | | | | |
|---|---|---|---|---|
| 2,920,494 | A * | 1/1960 | Dodwell | 474/84 |
| 4,579,549 | A * | 4/1986 | Okawa et al. | 474/242 |
| 4,619,634 | A * | 10/1986 | Nakawaki | 474/201 |
| 5,533,940 | A * | 7/1996 | Smeets | 474/242 |
| 6,238,313 | B1 * | 5/2001 | Smeets et al. | 474/244 |
| 6,270,437 | B1 * | 8/2001 | Yoshida et al. | 474/248 |
| 6,273,837 | B1 * | 8/2001 | Yoshida et al. | 474/242 |
| 6,708,383 | B2 * | 3/2004 | Arikawa et al. | 29/407.05 |
| 6,763,602 | B2 * | 7/2004 | Arikawa et al. | 33/701 |
| 6,830,525 | B1 | 12/2004 | Brandsma et al. | |
| 7,066,859 | B2 * | 6/2006 | Brandsma et al. | 474/242 |
| 2002/0025873 | A1 * | 2/2002 | Akagi et al. | 474/242 |
| 2003/0232674 | A1 * | 12/2003 | Saito et al. | 474/8 |

FOREIGN PATENT DOCUMENTS

| | | |
|---|---|---|
| JP | 2003-532840 | 11/2003 |
| JP | 2003-532840 A | 11/2003 |

* cited by examiner

*Primary Examiner*—Vicky A. Johnson
(74) *Attorney, Agent, or Firm*—Arent Fox LLP

(57) ABSTRACT

A metal belt includes a metal ring assembly formed from a plurality of layered endless metal rings, and a large number of metal elements supported on the metal ring assembly, the metal belt assembly being wound around a pulley and transmitting a driving force. The clearance between adjacent metal rings is set to be in a range from negative to positive from the innermost ring to a middle ring and to be only positive from the middle ring to the outermost ring. Therefore, good lubricating conditions can be maintained by virtue of the clearance being always positive for sliding surfaces of the metal rings from the middle ring to the outermost ring, for which lubrication easily becomes insufficient in the prior art. Thus the behavior is stabilized, preventing a side face of the metal ring from coming into dynamic contact with a metal ring contact face of a neck portion of the metal element, and maintaining the tension of the metal ring in the innermost ring at a low level, so that friction is suppressed to extend the life of the ring.

4 Claims, 9 Drawing Sheets

EMBODIMENT

EMBODIMENT

METAL BELT

RELATED APPLICATION DATA

The present invention is based upon Japanese priority application No. 2005-36366, which is hereby incorporated in its entirety herein by reference.

BACKGROUND OF THE INVENTION

1. Field of the Invention

The present invention relates to a metal belt comprising a metal ring assembly including a plurality of layered endless metal rings and a large number of metal elements supported on the metal ring assembly. The metal belt is wound around pulleys and transmits a driving force.

2. Description of the Related Art

The published Japanese translation of PCT Application No. 2003-532840 discloses an arrangement in which, among a plurality of metal rings forming a metal ring assembly of a belt type continuously variable transmission, the nominal value of play between two adjacent metal rings is made negative on the innermost belt side, positive on the outermost belt side, and zero in a middle section therebetween, thus making tension acting on each metal ring constant to reduce variation in the life thereof.

However, the above-mentioned conventional arrangement does not take into consideration the problem that the innermost metal ring comes into contact with a saddle face of a metal element and receives a load higher than that acting on the other metal rings, and the further problem that when the amount of lubricating oil is small, the lubricating effect is degraded for metal rings outside a middle ring, and thus the side face of a metal ring receiving a high frictional force comes into dynamic contact with a metal ring contact face of a neck portion of the metal element and is worn, thus degrading the durability.

SUMMARY OF THE INVENTION

The present invention has been accomplished under the above-mentioned circumstances, and it is an object thereof to suppress the wear of the side face of a metal ring of a belt type continuously variable transmission thereby increasing the life.

In order to achieve the above object, there is provided a metal belt comprising a metal ring assembly including a plurality of layered endless metal rings and a large number of metal elements supported on the metal ring assembly. The metal belt is wound around pulleys and transmits a driving force thereto. The clearance between adjacent metal rings is set to be in a range from negative to positive from the innermost ring to a middle ring, and to be only positive from the middle ring to the outermost ring.

With the first feature, the clearance between adjacent metal rings is set to be in the range from negative to positive from the innermost ring to the middle ring, and to be only positive from the middle ring to the outermost ring. Therefore, good lubricating conditions can be maintained by virtue of the clearance being always positive for sliding surfaces of the metal rings from the middle ring to the outermost ring, for which lubrication easily becomes insufficient when the amount of lubrication is small, thus stabilizing the behavior, and preventing the side face of the metal ring from coming into dynamic contact with a metal ring contact face of a neck portion of the metal element, so that wear of the side face of the metal ring can be suppressed to extend the life. Furthermore, since the amount of lubrication is sufficient for the metal rings from the innermost ring to the middle ring, and the clearance between adjacent metal rings is set to be in the range from negative to positive, the load on the innermost metal ring is not increased.

Further, according to a second feature of the present invention, in addition of the first feature, a cumulative value of the clearance between adjacent metal rings is set to be in a range from negative to positive from the innermost ring to the middle ring, and to be only positive from the middle ring to the outermost ring.

With the second feature, the cumulative value of the clearance between adjacent metal rings is set to be in the range from negative to positive from the innermost ring to the middle ring, and to be only positive from the middle ring to the outermost ring. Therefore, a large clearance is given to the outside metal rings, for which the lubrication conditions become poor in the prior art when the amount of lubrication is small, and thus a large amount of lubricating oil can be retained, thereby further increasing the life of the metal ring.

Furthermore, according to a third feature of the present invention, the cumulative value of the clearance between adjacent metal rings is set so that the more outward a ring is in a range from the middle ring to the outermost ring the more an upper allowable limit and a lower allowable limit are offset toward the positive side.

With the third feature, the cumulative value of the clearance between adjacent metal rings is set so that the more outward the ring is in a range from the middle ring to the outermost ring the more the upper allowable limit and the lower allowable limit are offset toward the positive side. Therefore, a large clearance is also given to the outside metal rings, for which the lubrication conditions become poor in the prior art when the amount of lubrication is small, thus a large amount of lubricating oil can be retained, and the tension of the innermost metal ring can be maintained at a low level, thereby further increasing the life of the metal ring.

The above-mentioned object, other objects, characteristics, and advantages of the present invention will become apparent from a preferred embodiment that will be described in detail below in reference to the attached drawings.

DESCRIPTION OF PREFERRED EMBODIMENT

Figure 2:
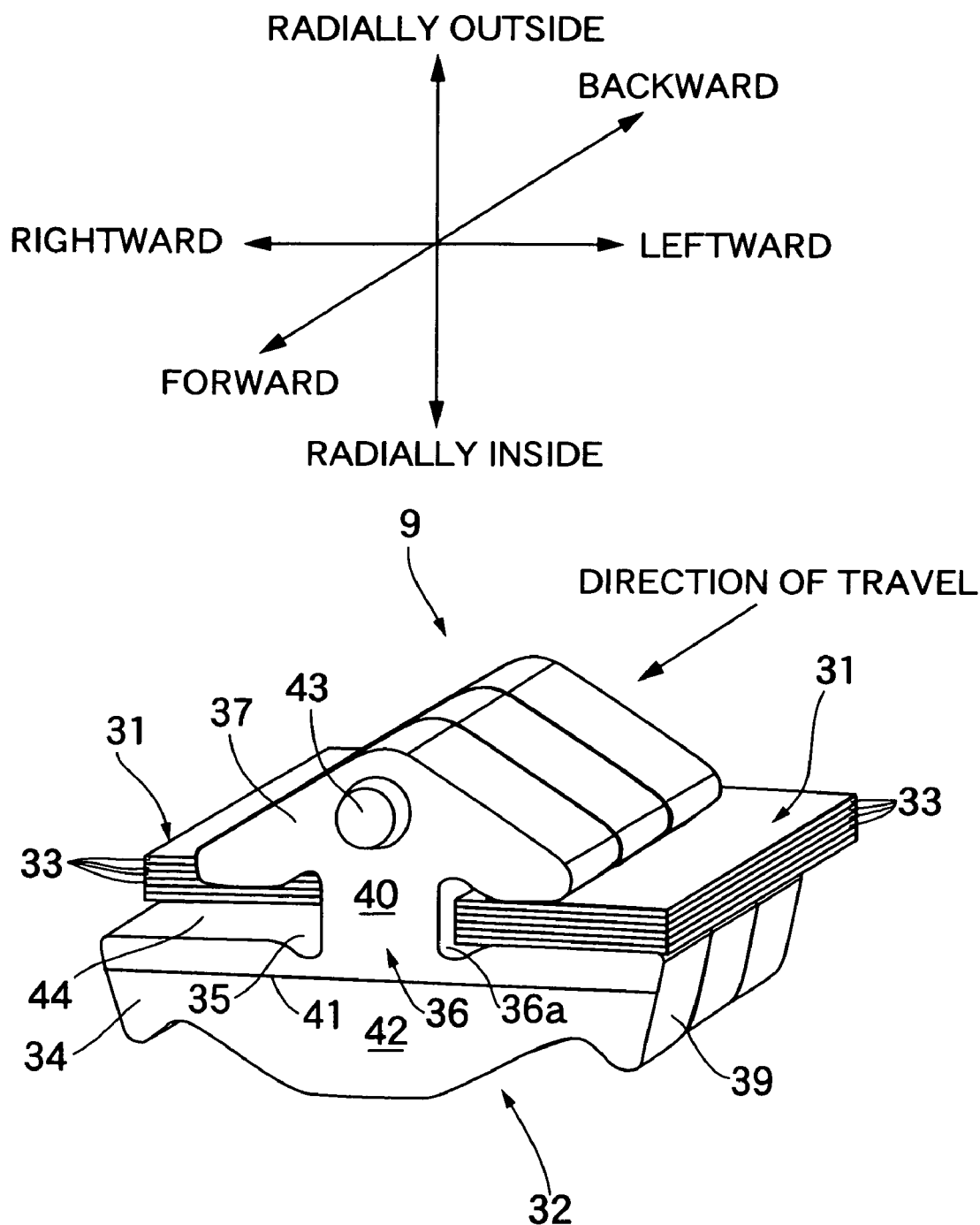
FIG. 2 is a partial perspective view of the metal belt.

FIG. 2 shows definitions of the fore-and-aft direction, the width direction, and the radial direction of a metal element or a metal ring used in the preferred embodiment. The radial direction is defined as the radial direction of a pulley against which the metal element abuts, the side closer to the shaft of the pulley being radially inside, and the side farther from the shaft of the pulley being radially outside. The width direction is defined as a direction along the shaft of the pulley against which the metal element abuts, and the fore-and-aft direction is defined as a direction along the direction of travel of the metal element when a vehicle travels forward.

Figure 1:
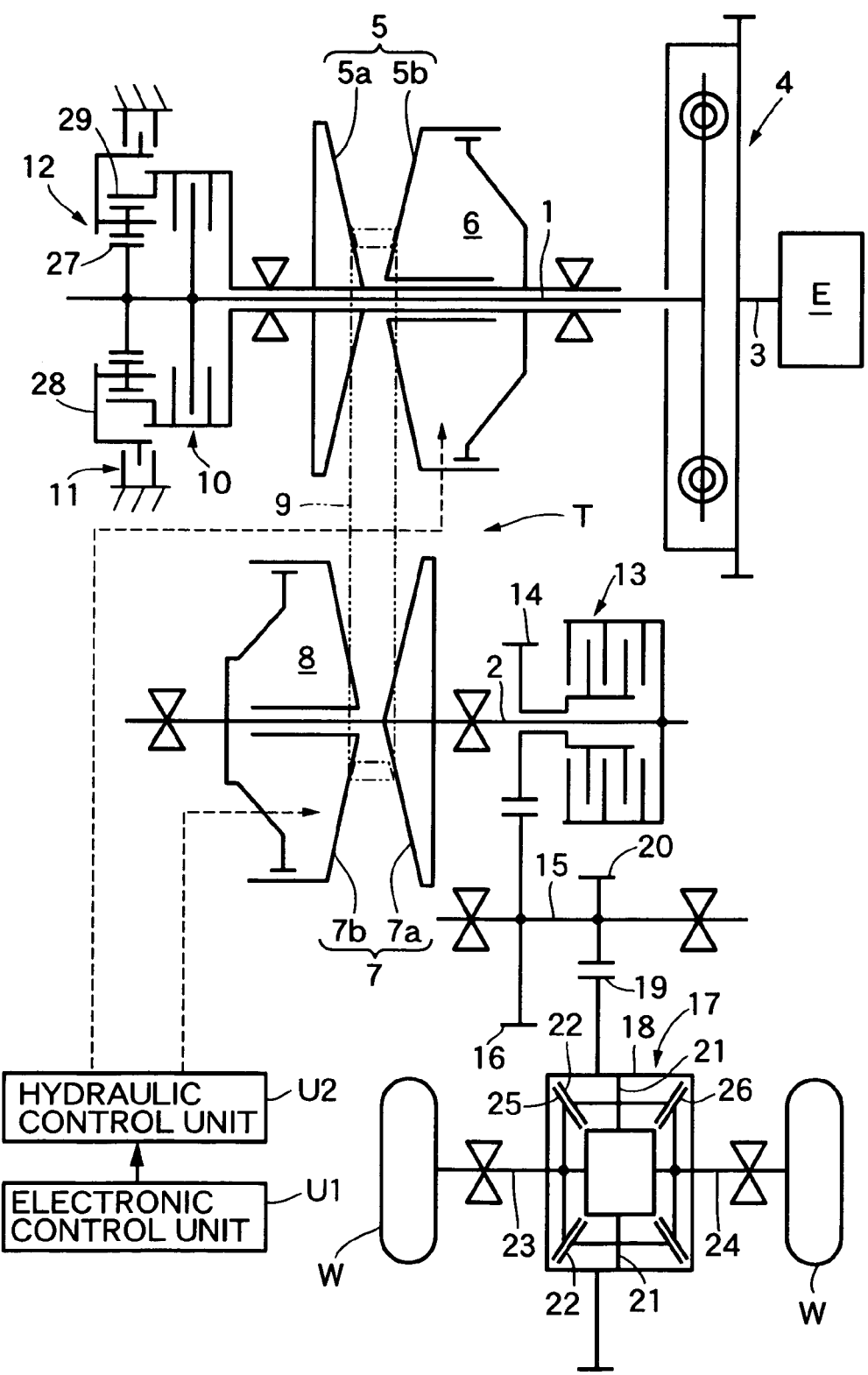
FIG. 1 is a skeleton diagram of a power transmission system of a vehicle equipped with a belt type continuously variable transmission which includes a metal belt according to the present invention.

As shown in FIG. 1, a belt type continuously variable transmission T for a vehicle includes a drive shaft 1 and a driven shaft 2 disposed in parallel. The left end of a crank shaft 3 of an engine E is connected to the right end of the drive shaft 1 via a damper 4.

A drive pulley 5 supported on the drive shaft 1 includes a fixed pulley half 5a that is rotatable relative to the drive shaft 1, and a movable pulley half 5b that is axially slidable relative to the fixed pulley half 5a. The channel width between the movable pulley half 5b and the fixed pulley half 5a can be varied by hydraulic pressure acting through a hydraulic chamber 6. A driven pulley 7 supported on the driven shaft 2 includes a fixed pulley half 7a that is formed integrally with the driven shaft 2, and a movable pulley half 7b that is axially slidable relative to the fixed pulley half 7a. The channel width between the movable pulley half 7b and the fixed pulley half 7a can be varied by hydraulic pressure acting through a hydraulic chamber 8. Wound around the drive pulley 5 and the driven pulley 7 is a metal belt 9 formed by mounting a large number of metal elements on two metal ring assemblies.

Provided on the left end of the drive shaft 1 is a forward/reverse travel switching mechanism 12, which is a single pinion type planetary gear mechanism including a forward clutch 10 to be engaged for establishing a forward gear position and transmitting rotation of the drive shaft 1 to the drive pulley 5 in the same direction, and a reverse brake 11 to be engaged for establishing a reverse gear position and transmitting rotation of the drive shaft 1 to the drive pulley 5 in the reverse direction. A sun gear 27 of the forward/reverse travel switching mechanism 12 is fixed to the drive shaft 1, a planetary carrier 28 can be restrained to a casing by the reverse brake 11, and a ring gear 29 can be coupled to the drive pulley 5 by the forward clutch 10.

A starting clutch 13 provided at the right end of the driven shaft 2 couples a first middle gear 14 relatively rotatably supported on the driven shaft 2 to the driven shaft 2. A second middle gear 16 meshing with the first middle gear 14 is provided on a middle shaft 15 disposed in parallel to the driven shaft 2. A third middle gear 20 provided on the middle shaft 15 meshes with an input gear 19 provided on a gear box 18 of a differential gear 17. Side gears 25 and 26 are provided at extremities of a left axle 23 and a right axle 24 which are relatively rotatably supported on the gear box 18, and mesh with a pair of pinions 22 supported on the gear box 18 via pinion shafts 21. Driven wheels W are connected to extremities of the left axle 23 and the right axle 24.

When a forward range is selected by a select lever, the forward clutch 10 is first engaged by a command from a hydraulic control unit U2 actuated by an electronic control unit U1. As a result, the drive shaft 1 is coupled integrally to the drive pulley 5. Subsequently, the start clutch 13 is engaged, and the torque of the engine E is transmitted to the driven wheels W via the drive shaft 1, the drive pulley 5, the metal belt 9, the driven pulley 7, the driven shaft 2, and the differential gear 17, so that the vehicle starts traveling forward. When a reverse range is selected by the select lever, the reverse brake 11 is engaged by a command from the hydraulic control unit U2 and the drive pulley 5 is driven in a direction opposite to the rotational direction of the drive shaft 1, so that the vehicle starts reversing due to the start clutch 13 being engaged.

When the vehicle starts in this way, the hydraulic pressure supplied to the hydraulic chamber 6 of the drive pulley 5 is increased by a command from the hydraulic control unit U2, the movable pulley half 5b of the drive pulley 5 approaches the fixed pulley half 5a to increase the effective radius, the hydraulic pressure supplied to the hydraulic chamber 8 of the driven pulley 7 decreases, the movable pulley half 7b of the driven pulley 7 moves away from the fixed pulley half 7a to decrease the effective radius, and the ratio of the belt type continuously variable transmission T, thereby continuously varying from a LOW ratio (the maximum ratio) to an OD ratio (the minimum ratio).

As shown in FIG. 2, the metal belt 9 is formed by supporting a large number of metal elements 32 on a pair of left and right metal ring assemblies 31, each metal ring assembly 31 being formed by layering a plurality (12 in the embodiment) of metal rings 33. With regard to the twelve metal rings 33, that in the innermost layer (first layer) or ring is denoted by #1, and those thereafter are denoted in turn by #2, #3, #4 . . . #12 up to the metal ring 33 in the outermost layer (twelfth layer) or ring.

The metal element 32, which is formed by punching out a metal sheet material, includes an element main body 34, a neck portion 36 positioned between a pair of left and right ring slots 35 with which the metal ring assemblies 31 engage, and an ear portion 37 having a substantially triangular shape connected to the radially outer side of the element main body 34 via the neck portion 36. A pair of pulley abutment faces 39, which abut against V faces of the drive pulley 5 and the driven pulley 7, are formed at opposite ends in the left-and-right direction of the element main body 34. Further, principal faces 40 are formed on the front and rear sides, in the direction of travel, of the metal element 32, the principal faces 40 being in contact with each other, and an inclined face 42 is formed in a lower part of the principal face 40 on the front side in the direction of travel via a rocking edge 41 extending in the left-and-right direction. Furthermore, in order to join metal elements 32 that are adjacent in the fore-and-aft direction, projection/recess parts 43 are formed on front and rear faces of the ear portions 37, the projection/recess parts 43 being capable of interlocking with each other. Moreover, saddle faces 44 are formed at lower edges of the left and right ring slots 35 for supporting inner peripheral faces of the metal ring assemblies 31.

Figure 3:
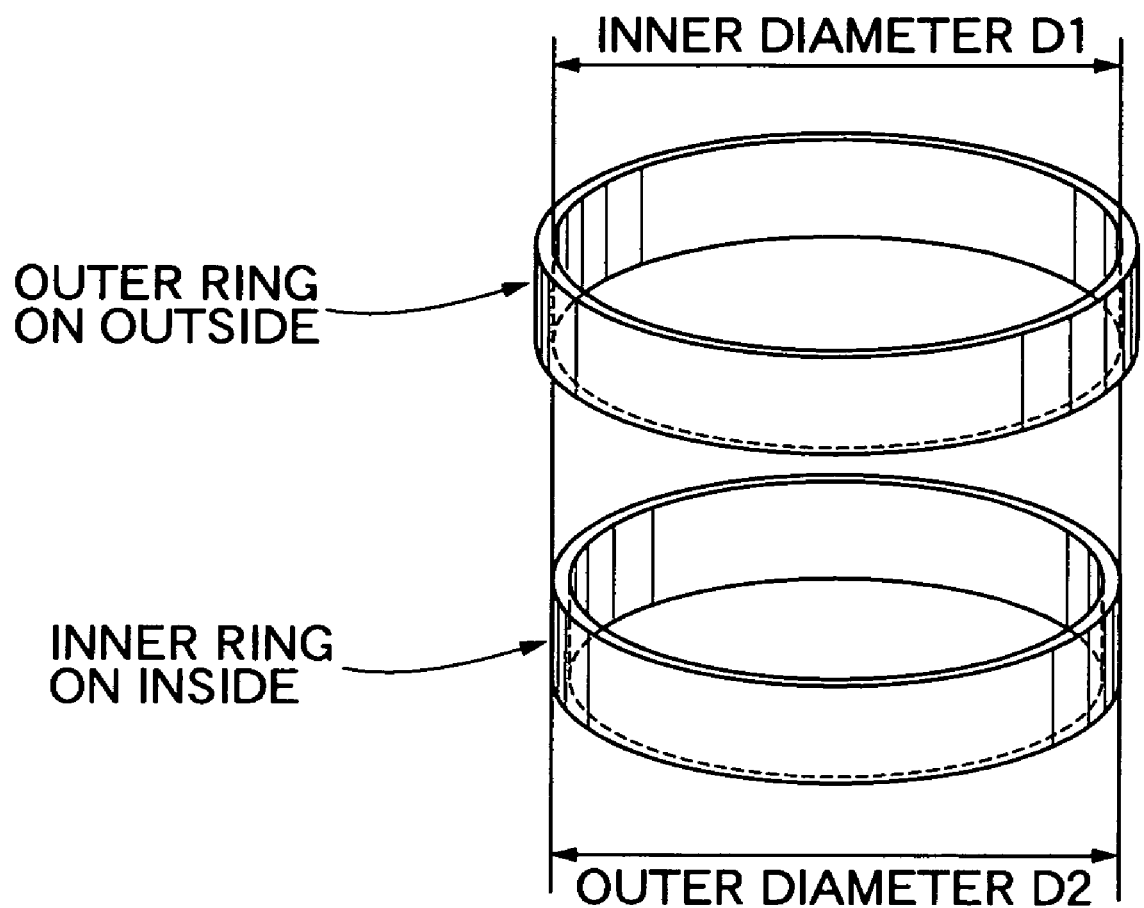
FIG. 3 is a diagram for explaining the definition of clearance between adjacent metal rings.

As shown in FIG. 3, the clearance between adjacent metal rings 33 is defined as a difference D1-D2 between a diameter D1 of the inner peripheral face of the outer metal ring 33 and a diameter D2 of the outer peripheral face of the inner metal ring 33. The clearance D1-D2 being negative means that, when the two metal rings 33 are layered, a surface pressure is generated on the contact faces of the two.

Figure 4A:
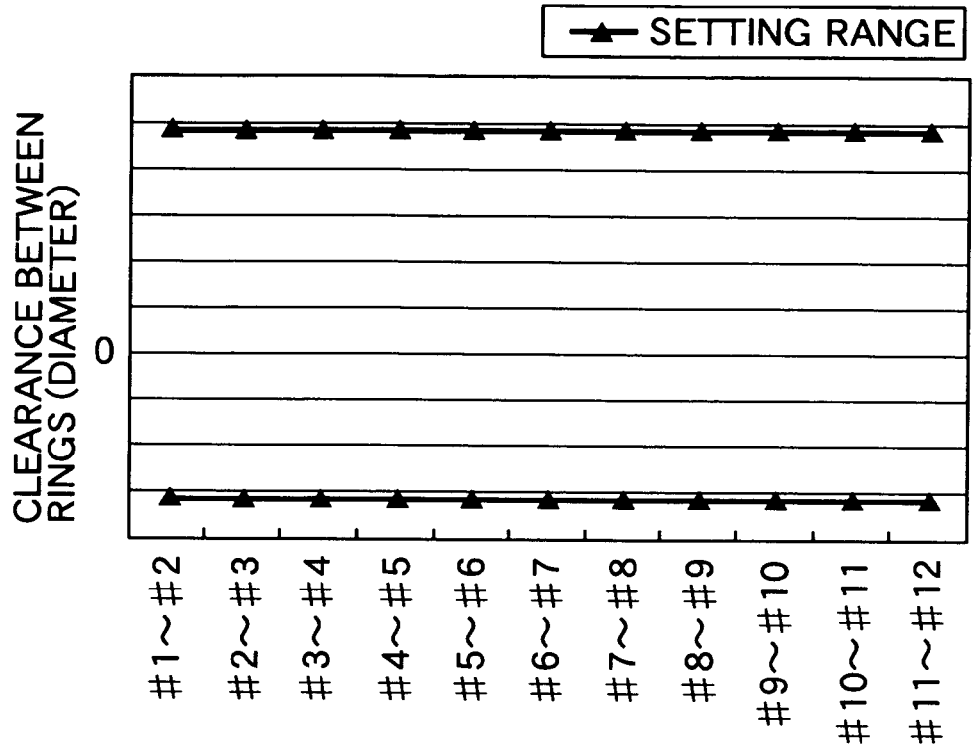
FIGS. 4A and 4B are graphs showing setting of the clearance between adjacent metal rings.

FIG. 4A shows a setting range for the clearance between twelve metal rings 33 of a conventional metal ring assembly 31. The representation '#N to #N+1' shows a setting range for the clearance between the Nth metal ring 33 and its adjacent (N+1)th metal ring 33. As is clear from this figure, with regard to the metal ring assembly 31 of the conventional device, the setting range for the clearance falls between a preset lower limit value and a preset upper limit value for all of the metal rings 33 from the innermost ring #1 to the outermost ring #12.

Figure 4B:
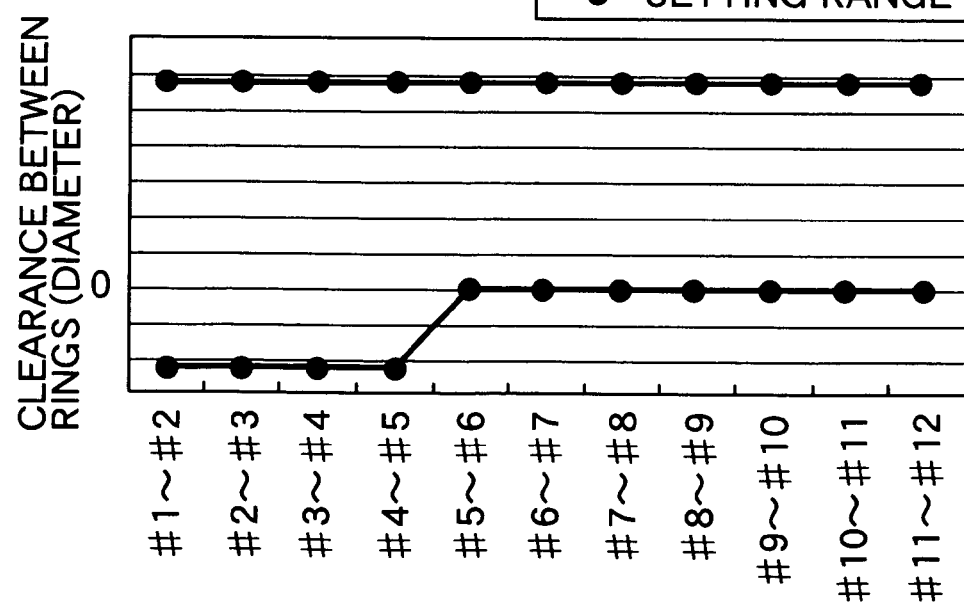

FIG. 4B shows a setting range for the clearance between the twelve metal rings 33 of the metal ring assembly 31 of the present invention. As is clear from this figure, with regard to the metal ring assembly 31 of the preferred embodiment, the setting range for the clearance between the metal rings 33 from the innermost ring #1 to a middle ring #5 is set in a range from negative to positive, and the setting range for the clearance between the metal rings 33 from the middle ring #5 to the outermost ring #12 is set in a positive range.

Figure 5A:
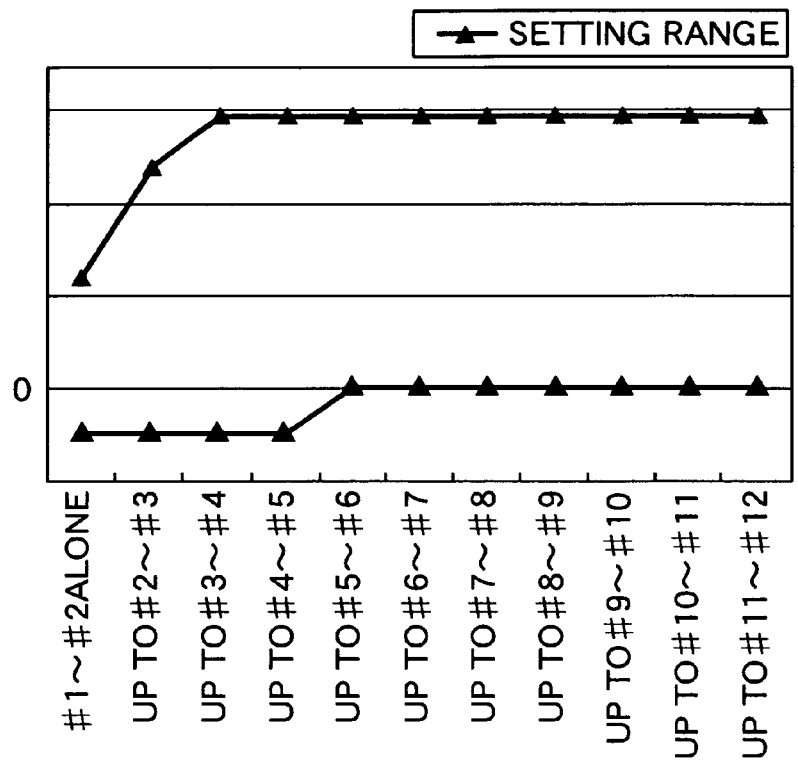
FIGS. 5A and 5B are graphs showing setting of the cumulative value of the clearance between adjacent metal rings.

FIG. 5A shows a setting range for the cumulative value of the clearance between the twelve metal rings 33 of the metal ring assembly 31 of the conventional device. As is clear from this figure, with regard to the metal ring assembly 31 of the conventional device, the setting range for the cumulative value of the clearance between the metal rings 33 from the innermost ring #1 to a middle ring #5 is set in a range from negative to positive, and the setting range for the cumulative value of the clearance between the metal rings 33 from the middle ring #5 to the outermost ring #12 is set in a positive range.

Figure 5B:
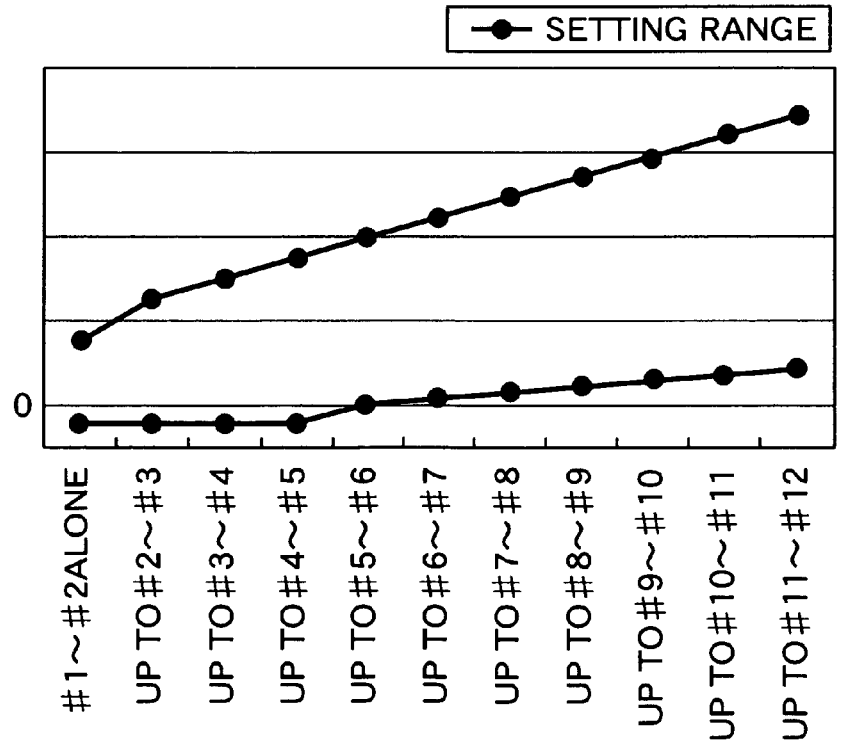

FIG. 5B shows a setting range for the cumulative value of the clearance between the twelve metal rings 33 of the metal ring assembly 31 of the preferred embodiment. As is clear from this figure, with regard to the metal ring assembly 31 of the preferred embodiment also, the setting range for the cumulative value of the clearance between the metal rings 33 from the innermost ring #1 to the middle ring #5 is set in a range from negative to positive, and the setting range for the cumulative value of the clearance between the metal rings 33 from the middle ring #5 to the outermost ring #12 is set in a positive range.

However, in the conventional device the setting range for the cumulative value of the clearance between the metal rings 33 from the middle ring #5 to the outermost ring #12 is held constant, in the present invention the setting range for the cumulative value of the clearance between the metal rings 33 from the middle ring #5 to the outermost ring #12 gradually increases from 0 μm to a predetermined value for the lower limit value side. For the upper limit value side it gradually increases from the innermost ring #1 to the outermost ring #12.

Figure 6:
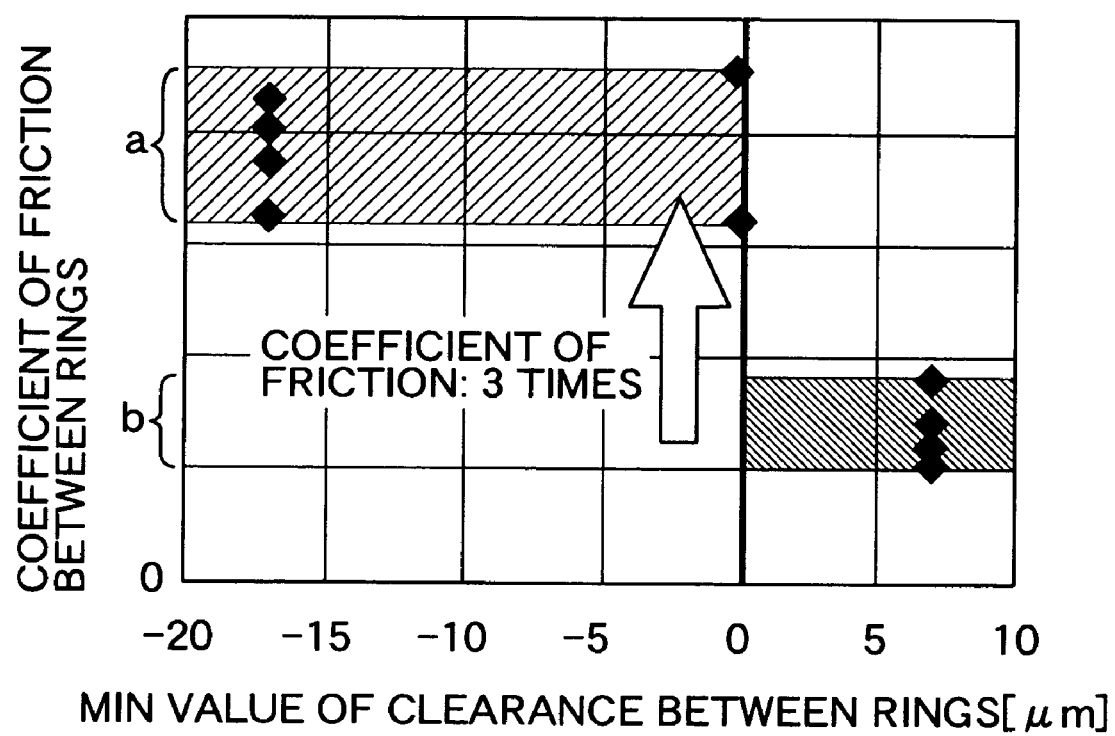
FIG. 6 is a graph showing the relationship between the coefficient of friction and the minimum value of the clearance between adjacent metal rings when the amount of lubrication is small.

FIG. 6 shows the relationship of the coefficient of friction between the metal rings 33 to the minimum value of the clearance between the metal rings 33 when the amount of lubrication is small. As is clear from this figure, when the minimum value of the clearance between the metal rings 33 is a negative value (friction coefficient a), the friction coefficient jumps up by about 3 times compared with the case of a positive value (friction coefficient b). It is surmised that the reason therefor is because, when the clearance between two of the metal rings 33 becomes a negative value, it becomes difficult to retain the lubricating oil on the contact faces thereof.

Figure 9:
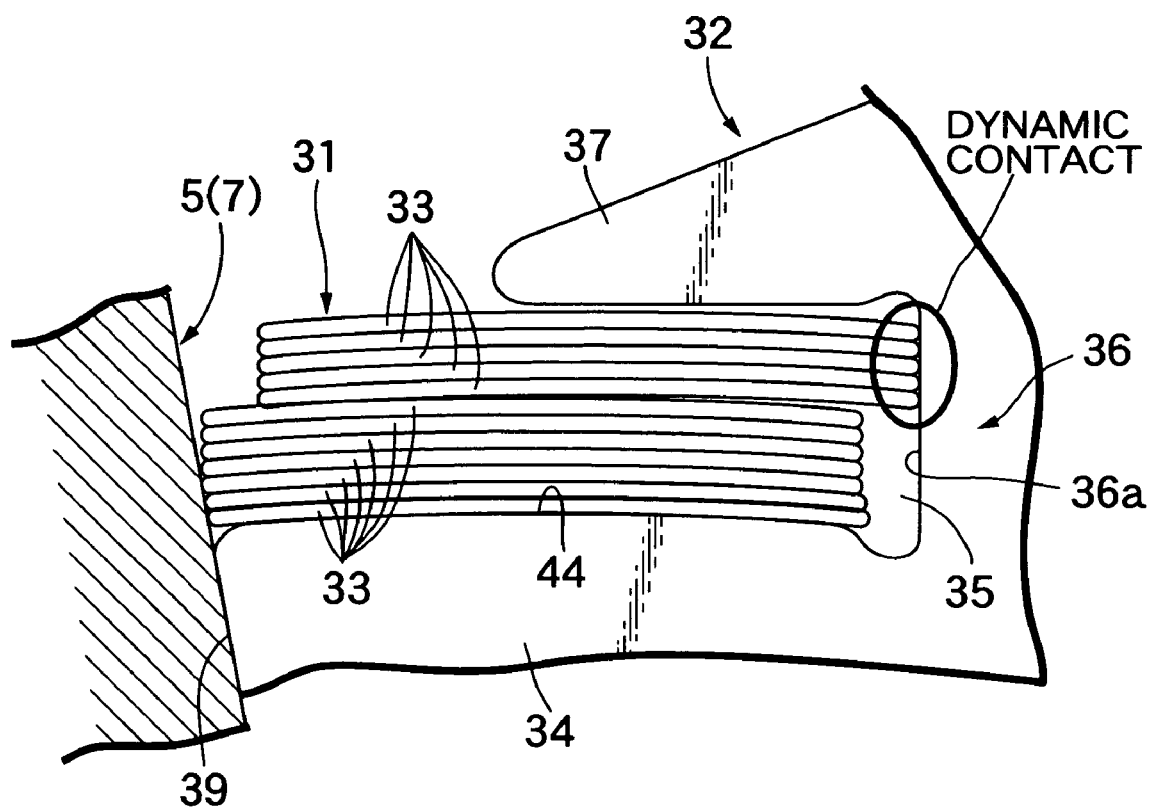
FIG. 9 is a diagram showing a state in which metal rings are in contact with a metal ring contact face of a neck portion of a metal element.

Furthermore, since supply of the lubricating oil to the metal ring assembly 31 is carried out through the interiors of the drive shaft 1 and the driven shaft 2, when the amount of lubrication is small, the metal ring 33 in the innermost ring #1 can be most easily lubricated, and lubrication of the metal ring 33 in the outermost ring #12 becomes most difficult. Therefore, if the setting range for the clearance is the same for all the metal rings 33 from the innermost ring #1 to the outermost ring #12 as shown in FIG. 4A, when the amount of lubrication is small, the coefficient of friction between the plurality of metal rings 33 outward of the middle ring, which are difficult to lubricate, increases; and the metal rings 33 are frictionally fixed so that they cannot move relative to each other. As a result, as shown in FIG. 9, the group of the plurality of metal rings 33 outward of the middle ring may slide as a unit toward the neck portion 36 with respect to the plurality of metal rings 33 inward of the middle ring. When the amount of lubrication is small, this sliding causes repetitive dynamic contact between side faces of the plurality of metal rings 33 that are outward of the middle layer and the metal ring contact face 36a of the neck portion 36 of the metal element 32, thus causing wear of the side faces of the metal rings 33, thereby degrading the durability.

However, in the preferred embodiment, since the setting range for the clearance of the plurality of metal rings 33 outward of the middle ring, for which lubrication in the prior art is likely to be insufficient, is limited to a positive value range as shown in FIG. 4B, and therefore good lubrication conditions can be maintained for the sliding surfaces of the metal rings 33 outward of the middle ring, thus stabilizing the behavior. Even when the amount of lubrication is small, it is possible to prevent the metal rings 33 from coming into dynamic contact with the metal ring contact face 36a of the neck portion 36 of the metal element 32, thus suppressing wear to extend the life. Furthermore, since there is a sufficient amount of lubrication for the metal rings 33 from the innermost ring to the middle ring, the allowance for the clearance between the layered metal rings 33 is in a range from negative to positive, so that the load on the metal ring 33 in the innermost layer is not increased.

Moreover, as shown in FIG. 5B, the cumulative value of the clearance between adjacent metal rings 33 is set to be in the range from negative to positive for those inward of the middle ring, and to be only positive for those outward of the middle ring; the more the upper allowable limit and the lower allowable limit are offset toward the positive side for those farther out the middle ring, so that a larger amount of lubricating oil can be retained in the outside metal rings 33 for which the lubrication conditions become poor in the prior art; and the tension of the metal ring 33 in the innermost ring can be maintained at a low level. Therefore, the life of the metal rings can be further extended even when the amount of lubrication is small.

Figure 7:
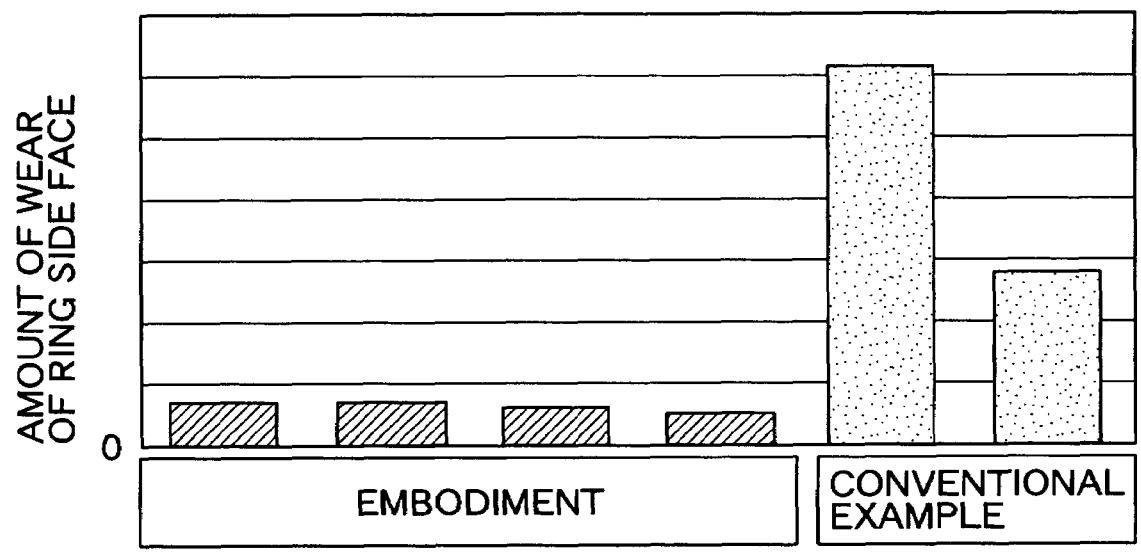
FIG. 7 is a graph showing the amount of wear of a side face of the metal ring when the amount of lubrication is small in the embodiment and in a conventional device.
Figure 8:
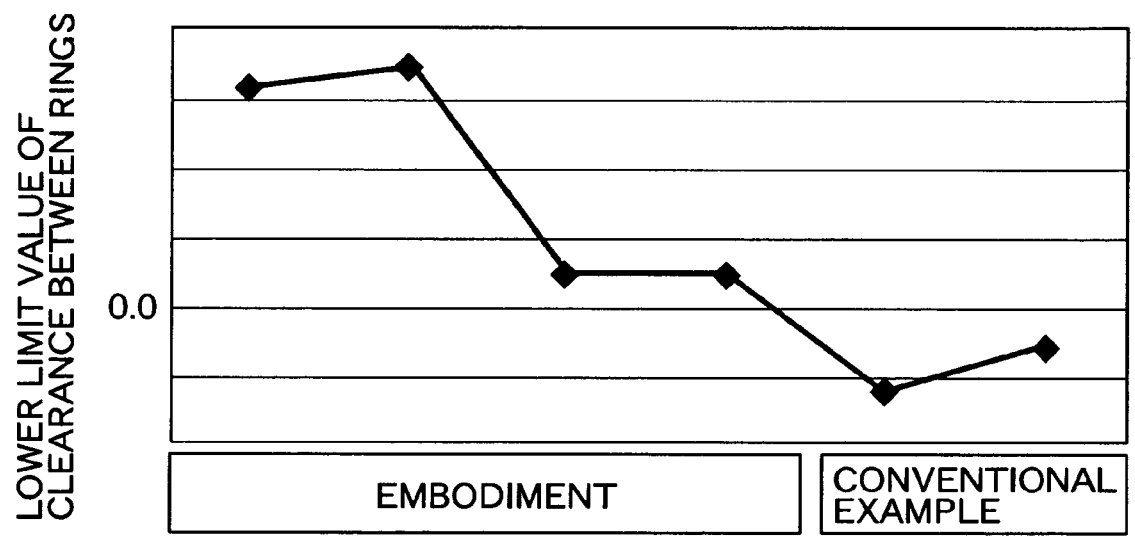
FIG. 8 is a graph, corresponding to FIG. 7, showing the minimum value of the clearance between adjacent metal rings.

FIG. 7 and FIG. 8 are comparisons in effect between the conventional device and the preferred embodiment when the amount of lubrication is small, and show the relationship of the amount of wear of side faces of the metal rings 33 with respect to the lower limit value of the clearance between the metal rings 33. For four samples of the embodiment, the amount of wear is suppressed to ¼ to ¹⁄₁₀ that of the conventional device.

Although the preferred embodiment of the present invention has been described above, the present invention is not limited to the above-mentioned embodiment and can be modified in a variety of ways without departing from the subject matter of the present invention described in the claims.

For example, the metal element 32 of the preferred embodiment supports a pair of metal ring assemblies 31 at opposite sides of the neck portion 26 which is positioned in the middle in the width direction of the metal element 32, but the metal element of the present invention may be a metal element in which a single metal ring assembly is supported between a pair of neck portions provided at opposite ends in the width direction of the metal element.

The invention claimed is:

1. A metal belt for being wound around pulleys and transmitting a driving force thereto, the metal belt comprising:
   - a metal ring assembly including a plurality of layered endless metal rings; and
   - a plurality of metal elements supported on the metal ring assembly;
   - wherein a clearance between adjacent metal rings is set to be in a range from negative to positive from an innermost ring to a middle ring, and to be only positive from the middle ring to an outermost ring.

2. The metal belt according to claim 1, wherein a cumulative value of the clearance between adjacent metal rings is set to be in a range from negative to positive from the innermost ring to the middle ring, and to be only positive from the middle ring to the outermost ring.

3. The metal belt according to claim 2, wherein a cumulative value of the clearance between adjacent metal rings is set such that the more outward a selected metal ring is from the middle ring to the outermost ring, the more an upper allowable limit and a lower allowable limit are offset toward the positive side.

4. The metal belt according to claim 1, wherein the clearance between adjacent metal rings is defined as a difference between a diameter (D1) of an inner peripheral surface of an outer one of the metal rings and a diameter (D2) of an outer peripheral surface of an inner one of the metal rings adjacent to the outer one of the metal rings.

* * * * *